United States Patent [19]

Knox et al.

[11] Patent Number: 5,227,416
[45] Date of Patent: Jul. 13, 1993

[54] INTUMESCENT FLAME RETARDANT COMPOSITION

[75] Inventors: Carol L. Knox, Monroeville; Suresh B. Damle, Pittsburgh, both of Pa.

[73] Assignee: PPG Industries, Inc., Pittsburgh, Pa.

[21] Appl. No.: 813,236

[22] Filed: Dec. 23, 1991

[51] Int. Cl.$^5$ .............. C08K 9/04; C08K 3/32
[52] U.S. Cl. .................. 524/101; 252/609; 524/251; 524/415; 524/416
[58] Field of Search ............ 524/101, 416, 415, 251; 252/609; 523/210, 205; 544/221

[56] References Cited

U.S. PATENT DOCUMENTS

| | | | |
|---|---|---|---|
| 3,088,948 | 5/1963 | Little et al. | 544/221 |
| 3,293,224 | 12/1966 | Fitz-Williams et al. | 528/226 |
| 3,700,667 | 10/1972 | Kitano et al. | 544/221 |
| 3,936,416 | 2/1976 | Brady | 523/100 |
| 3,959,219 | 5/1976 | Aoyama et al. | 524/101 |
| 3,980,616 | 9/1976 | Kimura et al. | 524/101 |
| 4,198,493 | 4/1980 | Marciandi | 524/101 |
| 4,359,541 | 11/1982 | Patton et al. | 544/221 |
| 4,727,102 | 2/1988 | Scarso | 252/609 |
| 5,096,961 | 3/1992 | Eberspach | 524/416 |

*Primary Examiner*—Veronica P. Hoke
*Attorney, Agent, or Firm*—George D. Morris

[57] ABSTRACT

When tris(2-hydroxyethyl) isocyanurate and a long chain amine are employed together in intumescent flame retardant compositions, tris(2-hydroxyethyl) isocyanurate bloom is substantially reduced or even eliminated, and yet the flame retardant effectiveness of the tris(2-hydroxyethyl) isocyanurate is substantially retained.

20 Claims, No Drawings

INTUMESCENT FLAME RETARDANT COMPOSITION

The use of organic polymers, and especially of polyolefins, for insulating electrically conducting wiring is known. Generally the organic polymer is extruded around the wire during manufacture. The organic polymer insulation is a good electrical insulator and, when used alone, is substantially waterproof. The main disadvantage of organic polymer insulation is its flammability. Once ignited, the burning organic polymer produces copious amounts of smoke and drips burning liquid organic polymer which tends to spread the fire. Organic polymer insulated wires and cables and bundles of these are therefore substantial fire hazards. It is commonplace in buildings and ships to have bundles of insulated electrical wires and cables passing through openings in walls or bulkheads to expedite the delivery of electrical power from room to room. In time of fire these openings can be instrumental in spreading the fire and smoke from room to room.

Various fire retardants have been admixed with the organic polymer in order to provide fire retardancy to the composition. These have been only partially successful, however, because most fire retardants are not very compatible with organic polymers or because they are prohibitively expensive for commercial applications.

One approach that has been followed is the incorporation of materials which impart intumescence to the organic polymer-based insulation composition. Such intumescent compositions form adherent chars which swell up and impede further burning of the underlying composition. One class of intumescent compositions used for electrical wiring insulation comprises organic polymer, ammonium polyphosphate, and at least one carbonific. In most, but not all, cases at least one spumific is also present. Carbonifics are nonresinous materials which produce large volumes of both nonflammable gas and carbon in the presence of phosphoric acid. Carbonific materials are generally carbohydrates or polyfunctional alcohols such as pentaerythritol. Spumifics are materials which release large quantities of gas at elevated temperatures. Spumifics are often resinous in nature and often act as binders in addition to forming gas. Spumific materials are most often amides or amines such as urea, guanidine, or dicyandiamide, which liberate gaseous pyrolysis products.

Ammonium polyphosphate, often abbreviated "APP", is particularly useful because it has a high phosphorus content and because it yields phosphoric acid at temperatures below the decomposition temperatures of the carbonifics and spumifics and yet above the normal temperatures used for processing the intumescent composition.

Tris(2-hydroxyethyl) isocyanurate [CAS 839-90-7], often abbreviated as THEIC, is known to be an especially effective carbonific, particularly in polyolefins. There is, however, a major problem associated with the use of THEIC as a carbonific in polyolefins and in many other polymers, namely, THEIC has an inherent tendency to exude to the surface of molded polymeric articles. The deposit resulting from this migration is often known as "plate out" or "bloom." Bloom often occurs during processing of the polymer-containing intumescent composition and leads to several disadvantages including one or more of the following: (1) buildup of THEIC on the molds, requiring frequent shut down and cleaning, (2) interference with heat-welding of molded parts, which is important in many applications, (3) reduction in water resistance of the molded part, and (4) interference of the aesthetics of the finished products due to the unsightly presence of sticky white powder on their surfaces.

It has now been found that when THEIC and a long chain amine are employed together in intumescent flame retardant compositions, the bloom problem is substantially reduced or even eliminated, and yet the flame retardant effectiveness of the THEIC is substantially retained. Accordingly, one embodiment of the invention is particles of surface-modified tris(2-hydroxyethyl) isocyanurate comprising particulate tris(2-hydroxyethyl) isocyanurate surface modified with at least one long chain amine.

Another embodiment of the invention is a composition comprising organic polymer, ammonium polyphosphate tris(2-hydroxyethyl) isocyanurate, and long chain amine.

The long chain amine is usually an amine represented by the formula $$RNH_2 \qquad (I)$$

wherein R is a hydrophobic hydrocarbon group. The hydrophobic hydrocarbon groups are will known and commonly used to impart hydrophobic functionality to surfactants. In most cases the hydrophobic hydrocarbon group contains from about 8 to about 30 carbon atoms. In many cases the hydrophobic hydrocarbon group contains from about 10 to about 22 carbon atoms. From about 12 to about 18 carbon atoms is preferred. Examples of hydrophobic hydrocarbon groups which may be used include straight or branched alkyl containing from about 8 to about 30 carbon atoms, straight or branched alkenyl containing from about 10 to about 22 carbon atoms, and straight or branched alkadienyl containing from about 14 to about 22 carbon atoms.

When R is alkyl, it ordinarily contains from about 8 to about 30 carbon atoms. In many cases when R is alkyl, it contains from about 10 to about 22 carbon atoms. From about 12 to about 18 carbon atoms is preferred.

When R is alkenyl, it ordinarily contains from about 10 to about 22 carbon atoms. Often when R is alkenyl, it contains from about 12 to about 22 carbon atoms. From about 18 to about 22 carbon atoms is preferred.

When R is alkadienyl, it ordinarily contains from about 14 to about 22 carbon atoms. About 18 carbon atoms is preferred.

When R is alkyl, alkenyl, or alkadienyl, it is preferably straight.

The preferred hydrophobic hydrocarbon groups are hydrophobic hydrocarbon groups corresponding to those of alcohols derived from long chain monocarboxylic acids which are themselves derived from the triglycerides of natural fats or oils. Octadecyl (viz., stearyl) is particularly preferred.

The preferred long chain amines are dodecylamine (viz., laurylamine) and octadecylamine (viz., stearylamine). The preferred unsaturated long chain amine is 9-octadecen-1-amine (viz., oleylamine).

The particles of surface-modified tris(2-hydroxyethyl) isocyanurate may be prepared by admixing the particulate tris(2-hydroxyethyl) isocyanurate with at least one long chain amine. The temperature at which the materials are mixed may vary considerably, but usually it is in the range of from about 20° C. to about 130° C. From about 70° C. to about 80° C. is preferred.

The amount of long chain amine present on the particles of surface-modified tris(2-hydroxyethyl) isocyanurate may be widely varied. In most cases the weight ratio of the long chain amine to the THEIC is in the range of from about 0.1:100 to about 15:100. Often the weight ratio is in the range of from about 0.5:100 to about 10:100. A weight ratio in the range of from about 1:100 to about 5:100 is preferred.

The organic polymer employed is water-insoluble and can be of many varying types. The organic polymer is usually flammable but in some cases it may be non-flammable. Ordinarily the organic polymer is thermoplastic. In most, but not all, instances the organic polymer is halogen-free. The organic polymer may be a homopolymer, a copolymer, a terpolymer, an interpolymer, a graft polymer, or a mixture of polymers. Examples of polymers which may be used include polyolefins, polystyrene, polyesters, polyamides, polyurethanes (including poly(ester urethanes) and poly(ether urethanes)), and polycarbonates. The preferred organic polymers are the polyolefins, including polyethylene (high density, medium density, low density, linear low density, or mixtures), polypropylene (atactic, isotactic, syndiotactic, stereoblock, or mixtures), copolymers of ethylene and propylene, copolymers of ethylene and vinyl acetate, and mixtures thereof, and poly(ester urethanes).

The ammonium polyphosphates are known polymeric phosphates, having P-O-P linkages and may be represented by the formula:

$$H_{n-m+2}(NH_4)_m P_n O_{3n+1} \quad (II)$$

wherein the average value of n is at least about 10, the average value of m is a number up to n+2, and the ratio m/n is in the range of from about 0.7 to about 1.2. In most cases the average value of n is in the range of from about 10 to about 1000. From about 250 to about 750 is preferred. The values of n and m for any particular compound will be positive integers, while the average values of n and m for a mixture of compounds constituting the ammonium polyphosphate may each individually be a positive integer or a positive number which is not an integer.

The polymer-containing composition of the invention can be prepared by admixing the various ingredients. The THEIC previously treated with the long chain amine can be admixed with the other ingredients. Alternatively, untreated THEIC, long chain amine, and the other ingredients can be combined in any order and admixed. The temperature at which the materials are mixed may be widely varied. In general, the temperature is at least that at which the polymer is a viscous liquid and below the decomposition temperature of any of the ingredients. In most cases the temperature is in the range of from about 125° C. to about 300° C. From about 150° C. to about 200° C. is preferred.

The amount of organic polymer present in the composition of the invention may be widely varied. In most instances the organic polymer constitutes from about 5 to about 95 percent by weight of the composition. Frequently the organic polymer constitutes from about 30 to about 80 percent by weight of the composition. From about 50 to about 75 percent by weight is preferred.

The amount of APP which is present in the composition of the invention is also subject to wide variation. Ordinarily the weight ratio of the APP to the organic polymer is in the range of from about 10:100 to about 100:100. Often the weight ratio is in the range of from about 15:100 to about 85:100. A weight ratio in the range of from about 20:100 to about 70:100 is preferred.

The amount of THEIC which is present in the composition of the invention may also be widely varied. Usually the weight ratio of THEIC to the organic polymer is in the range of from about 1:100 to about 100:100. In many instances the weight ratio is in the range of from about 5:100 to about 60:100. A weight ratio in the range of from about 3:100 to about 15:100 is preferred.

The amount of long chain amine which is present in the composition of the invention may be varied widely. In most cases the weight ratio of long chain amine to the organic polymer is in the range of from about 0.03:100 to about 15:100. Often the weight ratio is in the range of from about 0.1:100 to about 10:100. A weight ratio in the range of from about 0.2:100 to about 5:100 is preferred.

The composition usually, but not necessarily, also comprises one or more spumifics. The presence of spumific is optional, and therefore the amount present, if any, may be widely varied. When spumific is used, the weight ratio of spumific the organic polymer is ordinarily in the range of from about 1:100 to about 100:100. Often the weight ratio is in the range of from about 1.5:100 to about 50:100. A weight ratio in the range of from about 2:100 to about 10:100 is preferred.

One or more other materials which will increase fire retardancy may optionally be present in the composition. Examples of such materials include zinc oxide, zinc borate, and ferric oxide.

The compositions of the invention may optionally contain plasticizers, pigments, dyes, tints, antioxidants, visible light stabilizers, ultraviolet light stabilizers, and the like.

The listing of optional ingredients discussed above is by no means exhaustive. These and other ingredients may be employed in their customary amounts for their customary purposes so long as they are not antagonistic to flame retardant performance and good polymer formulating practice.

The compositions of the present invention have fire retardant characteristics and find many uses. They may be formulated as concentrates to be let down with additional organic polymer for further use. They may be extruded into fibers, films, or other shapes, or molded, shaped, or formed into substantially any form. A preferred use, however, is as electrical insulation for wires and cables.

The invention is further described in conjunction with the following examples which are to be considered illustrative rather than limiting, and in which all parts are parts by weight and all percentages are percentages by weight unless otherwise specified.

EXAMPLES 1, 2, C-1, C-2

For each of the compositions of Examples 1, 2, C-1, and C-2, polyethylene was introduced into a mixer and melted. THEIC and, if used, octadecylamine, were added to the melt and the materials were mixed until uniform to produce a test composition.

Abbreviations are shown in Table 1.

TABLE 1

| Abbreviation | Name |
|---|---|
| PE | Polyethylene |

TABLE 1-continued

| Abbreviation | Name |
| --- | --- |
| THEIC | Tris(2-hydroxyethyl) isocyanurate |
| ODA | Octadecylamine |

Plaques of the test compositions were pressed out between polished metal plates. When each assembly had cooled, the plates were separated from the plaque and the plates were observed for bloom transferred from the plaque. Bloom was rated on a scale ranging from 0 to 5 where a rating of zero indicated no bloom and a rating of 5 indicated bloom equivalent to that observed when octadecylamine was not present.

The amounts of materials and the test results are shown in Table 2 where Examples 1 and 2 are illustrative of the invention and where Examples C-1 and C-2 are comparative examples which are not illustrative of the invention.

TABLE 2

| Ingredient | Example | | | |
| --- | --- | --- | --- | --- |
|  | 1 | 2 | C-1 | C-2 |
| PE, grams | 46.3 | 46.1 | 46.4 | 45.0 |
| THEIC, grams | 3.6 | 3.6 | 3.6 | 5.0 |
| ODA, grams | 0.1 | 0.3 | 0.0 | 0.0 |
| Bloom Rating | 3 | 1 | 5 | 5 |

EXAMPLE 3

Octadecylamine-treated THEIC was prepared by mixing together 50 grams of THEIC and 1.5 grams of octadecylamine at 75° C. to 80° C. for 15 minutes in a Vee-Blender and then allowing the blender and its contents to cool while mixing continued.

Thirty-five grams of polyethylene was introduced into a mixer and melted. Next, 9.9 grams of ammonium polyphosphate, 3.6 grams of the octadecylamine-treated THEIC, and 1.5 grams of melamine cyanurate were added to the melt and the materials were mixed until uniform to produce a test composition.

Plaques of the test composition were pressed out between polished metal plates. When each assembly had cooled, the plates were separated from the plaque and the plates were observed for bloom transferred from the plaque. Bloom was rated on a scale ranging from 0 to 5 where a rating of zero indicated no bloom and a rating of 5 indicated bloom equivalent to that observed when octadecylamine was not present. The bloom ratings of the plaques were 0 or 1. Those plaques having a bloom rating of 1 showed slight signs of bloom around the edges.

Although the present invention has been described with reference to specific details of certain embodiments thereof, it is not intended that such details should be regarded as limitations upon the scope of the invention except insofar as they are included in the accompanying claims.

We claim:

1. Particles of surface-modified tris(2-hydroxyethyl) isocyanurate comprising particulate tris(2-hydroxyethyl) isocyanurate surface modified with at least one long chain amine represented by the formula
RNH$_2$ wherein R is a hydrophobic hydrocarbon group containing from about 8 to about 30 carbon atoms.

2. The particles of claim 1 wherein said hydrophobic hydrocarbon group is straight or branched alkyl containing from about 8 to about 30 carbon atoms, straight or branched alkenyl containing from about 10 to about 22 carbon atoms, or straight or branched alkadienyl containing from about 14 to about 22 carbon atoms.

3. The particles of claim 1 wherein said hydrophobic hydrocarbon group corresponds to that of an alcohol derived from a long chain monocarboxylic acid which is derived from the triglyceride of natural fat or oil.

4. The particles of claim 1 wherein said hydrophobic hydrocarbon group is octadecyl.

5. The particles of claim 1 wherein the weight ratio of said long chain amine to said tris(2-hydroxyethyl) isocyanurate is in the range of from about 0.1:100 to about 15:100.

6. The particles of claim 5 wherein said hydrophobic hydrocarbon group is an alkyl group containing from about 12 to about 18 carbon atoms.

7. The particles of claim 5 wherein said hydrophobic hydrocarbon group is octadecyl.

8. The particles of claim 7 wherein the weight ratio of said long chain amine to said tris(2-hydroxyethyl) isocyanurate is in the range of from about 1:100 to about 5:100.

9. A composition comprising polyethylene, ammonium polyphosphate, tris(2-hydroxyethyl) isocyanurate, and octadecylamine, wherein:
   (a) said polyethylene constitutes from about 5 to about 95 percent by weight of said composition;
   (b) the weight ratio of said ammonium polyphosphate to said polyethylene is in the range of from about 10:100 to about 100:100;
   (c) the weight ratio of said tris(2-hydroxyethyl) isocyanurate to said polyethylene is in the range of from about 1:100 to about 100:100; and
   (d) the weight ratio of said octadecylamine to said polyethylene is in the range of from about 0.03:100 to about 15:100.

10. A composition comprising polyethylene, ammonium polyphosphate, tris(2-hydroxyethyl) isocyanurate, and octadecylamine, wherein:
   (a) said polyethylene constitutes from about 50 to about 75 percent by weight of said composition;
   (b) the weight ratio of said ammonium polyphosphate to said polyethylene is in the range of from about 20:100 to about 70:100;
   (c) the weight ratio of said tris(2-hydroxyethyl) isocyanurate to said polyethylene is in the range of from about 3:100 to about 15:100; and
   (d) the weight ratio of said octadecylamine to said polyethylene is in the range of from about 0.2:100 to about 5:100.

11. A composition comprising organic polymer, ammonium polyphosphate, tris(2-hydroxyethyl) isocyanurate, and long chain amine represented by the formula
RNH$_2$ wherein:
   (a) R is a hydrophobic Hydrocarbon group containing from about 8 to about 30 carbon atoms;
   (b) said organic polymer constitutes from about 5 to about 95 percent by weight of said composition;
   (c) The weight ratio of said ammonium polyphosphate to said organic polymer is in the range of from about 10:100 to about 100:100;
   (d) the weight ratio of said tris(2-hydroxyethyl) isocyanurate to said organic polymer is in the range of from about 1:100 to about 100:100; and (e) the weight ratio of said long chain amine to said organic polymer is in the range of from about 0.03:100 to about 15:100.

12. The composition of claim 11 wherein said organic polymer is halogen-free.

13. The composition of claim 11 wherein said organic polymer is polyolefin.

14. The composition of claim 11 wherein said organic polymer is polyethylene.

15. The composition of claim 11 wherein said hydrophobic hydrocarbon group is straight or branched alkyl containing from about 8 to about 30 carbon atoms, straight or branched alkenyl containing from about alkadienyl containing from about 14 to about 22 carbon atoms.

16. The composition of claim 11 wherein said hydrophobic hydrocarbon group corresponds to that of an alcohol derived from a long chain monocarboxylic acid which is derived from the triglyceride of natural fat or oil.

17. The composition of claim 11 wherein said hydrophobic hydrocarbon group is octadecyl.

18. The composition of claim 11 wherein:
(a) said organic polymer constitutes from about 50 to about 75 percent by weight of said composition;
(b) the weight ratio of said ammonium polyphosphate to said organic polymer is in the range of from about 20:100 to about 70:100;
(c) the weight ratio of said tris(2-hydroxyethyl) isocyanurate to said organic polymer is in the range of from about 3:100 to about 15:100; and
(d) the weight ratio of said long chain amine to said organic polymer is in the range of from about 0.2:100 to about 5:100.

19. The composition of claim 18 wherein said organic polymer is polyolefin.

20. The composition of claim 18 wherein said organic polymer is polyethylene.

* * * * *

UNITED STATES PATENT AND TRADEMARK OFFICE
CERTIFICATE OF CORRECTION

PATENT NO. : 5,227,416
DATED : July 13, 1993
INVENTOR(S) : Carol L. Knox et al

It is certified that error appears in the above-identified patent and that said Letters Patent is hereby corrected as shown below:

Column 6, claim 11, line 59, "Hydrocarbon" should be --hydrocarbon--.

Column 7, claim 15, line 15, after "about" add --10 to about 22 carbon atoms, or straight or branched--.

Signed and Sealed this

Fifteenth Day of February, 1994

Attest:

BRUCE LEHMAN

*Attesting Officer*     Commissioner of Patents and Trademarks